Sept. 1, 1959   W. M. YOST ET AL   2,902,236
NAVIGATING DEVICE FOR AIRCRAFT
Filed Nov. 15, 1956   3 Sheets-Sheet 1

INVENTORS
WILLIAM M. YOST
THEODORE L. SENECAL
BY
ATTORNEYS

Sept. 1, 1959 W. M. YOST ET AL 2,902,236
NAVIGATING DEVICE FOR AIRCRAFT
Filed Nov. 15, 1956 3 Sheets-Sheet 2

INVENTORS
WILLIAM M. YOST
THEODORE L. SENECAL
BY
ATTORNEYS

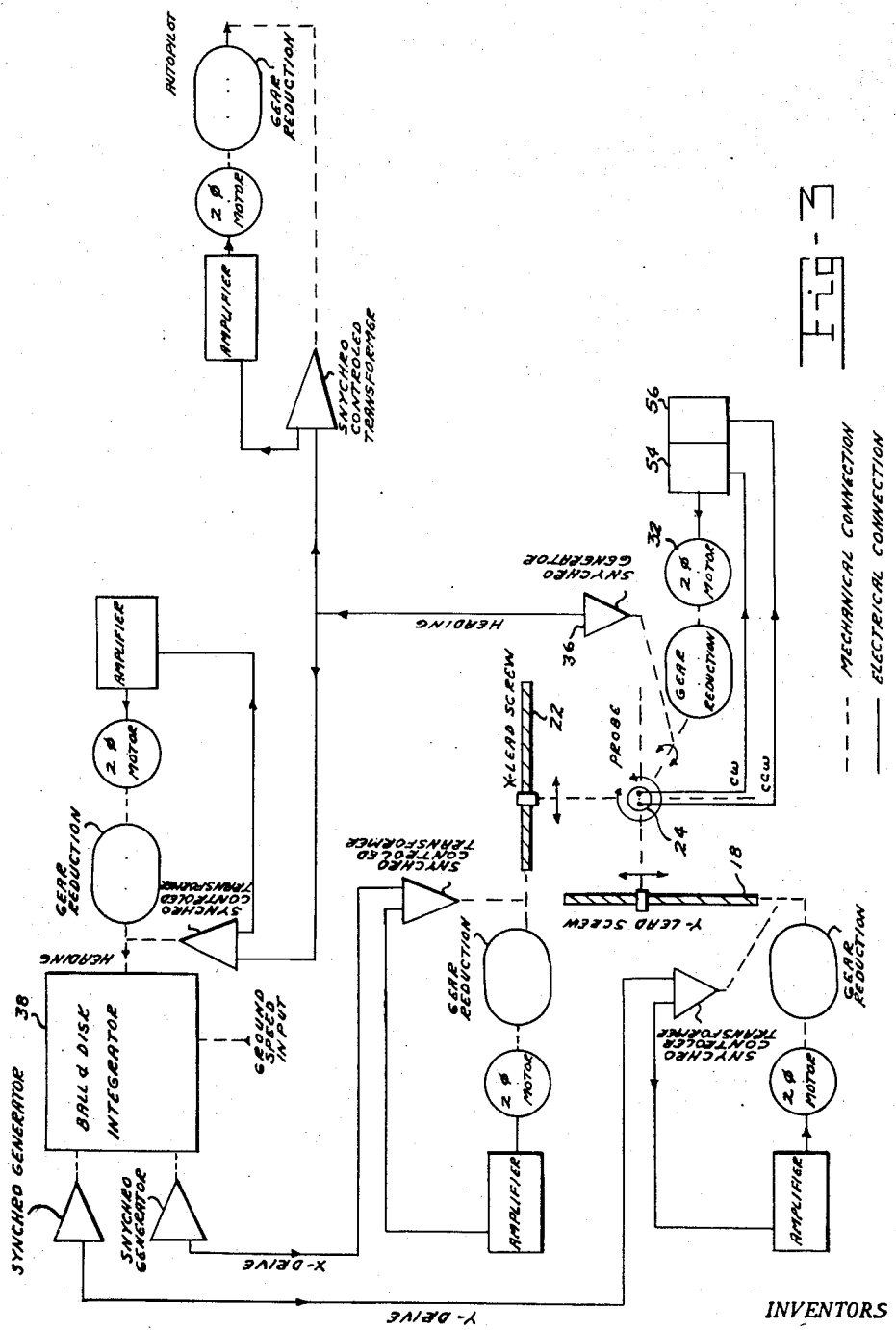

United States Patent Office 2,902,236
Patented Sept. 1, 1959

2,902,236

NAVIGATING DEVICE FOR AIRCRAFT

William M. Yost and Theodore L. Senecal, Dayton, Ohio, assignors to the United States of America as represented by the Secretary of the Air Force Application November 15, 1956, Serial No. 622,502

4 Claims. (Cl. 244—77)

(Granted under Title 35, U.S. Code (1952), sec. 266)

The invention described herein may be manufactured and used by or for the United States Government for governmental purposes without payment to us of any royalty thereon.

The invention relates to a navigating device and, more particularly, to a device for the automatic navigation of an aircraft according to a plotted course.

Navigation devices utilizing course or curve followers have been used to automatically control and direct aircraft. Those previously constructed suffered from a certain inflexibility. The course or curve the aircraft was to follow could not cross over itself. Yet, many missions such as photographic, reconnaissance, etc., require the aircraft to follow precise, complex paths which repeatedly cross over each other.

It is, therefore, a principal object of this invention to construct a navigating device for aircraft or other vehicles which can be steered in accordance with prearranged courses which may cross over each other.

A further object of this invention is to construct a navigating device for aircraft or other vehicles which is simple, reliable and economical.

These and other objects of this invention will be better understood by reference to the specification and drawings wherein:

Fig. 4 is a sectional view of the modified plotting board and curve follower taken on the line 4—4 of Fig. 1.

Fig. 5 is a sectional view of the stylus and associated mechanisms taken on the line 5—5 of Fig. 1.

Figure 1:
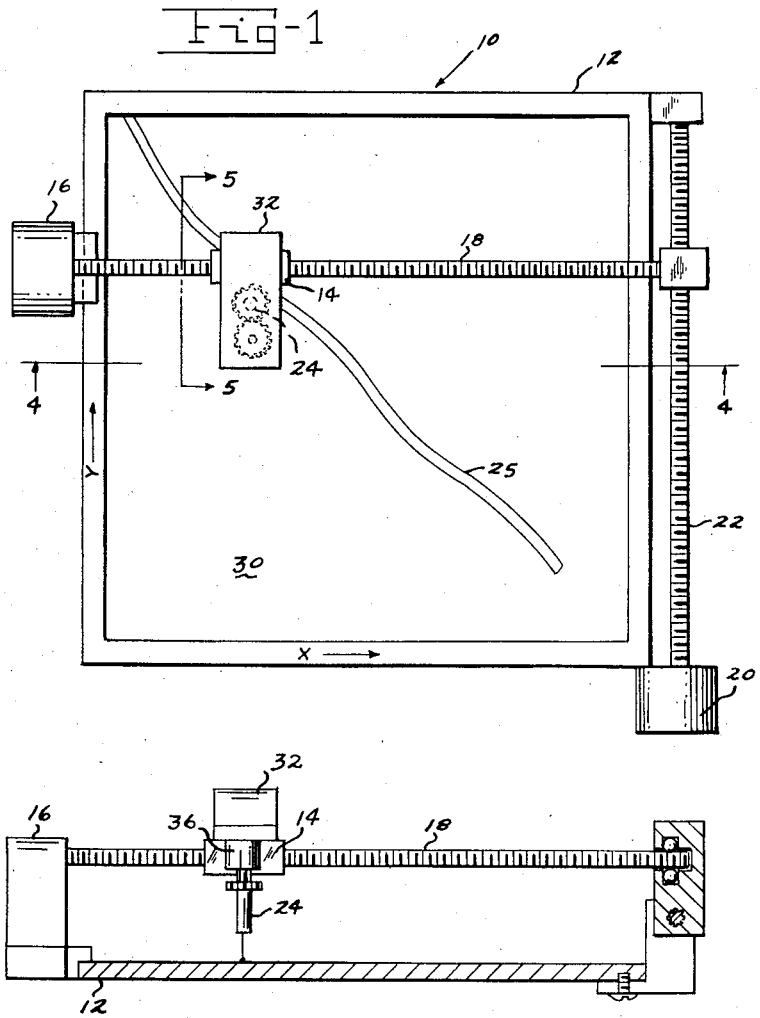
Fig. 1 is a top plan view of the modified plotting board and stylus of this navigating device.

Referring now to Fig. 1, the apparatus for navigation of mobile craft indicated generally at 10 comprises a support or plotting board 12. The plotting board 12 includes the usual carriage 14, including an *x* drive motor 16 and an *x* lead screw 18 for moving the carriage in the *x* direction. The carriage 14 along with *x* drive motor 16 and *x* lead screw 18 are connected in the usual way to *y* drive motor 20 and the *y* lead screw 22 for movement in the *y* direction, see Fig. 1. Rotatably mounted on carriage 14 is a stylus 24, see Fig. 5, having a pair of spaced electrical contacts 26 and 28 at one end which are adapted to engage the surface 30 of the plotting board. A two phase motor 32 and reduction gear train 34 are mounted on carriage 14 and are connected to stylus 24 for rotating it. A synchro-generator 36 is also mounted on carriage 14 and is connected to stylus 24 so its rotor rotates in a 1:1 relationship with the stylus for purposes to be described below.

Figure 2:
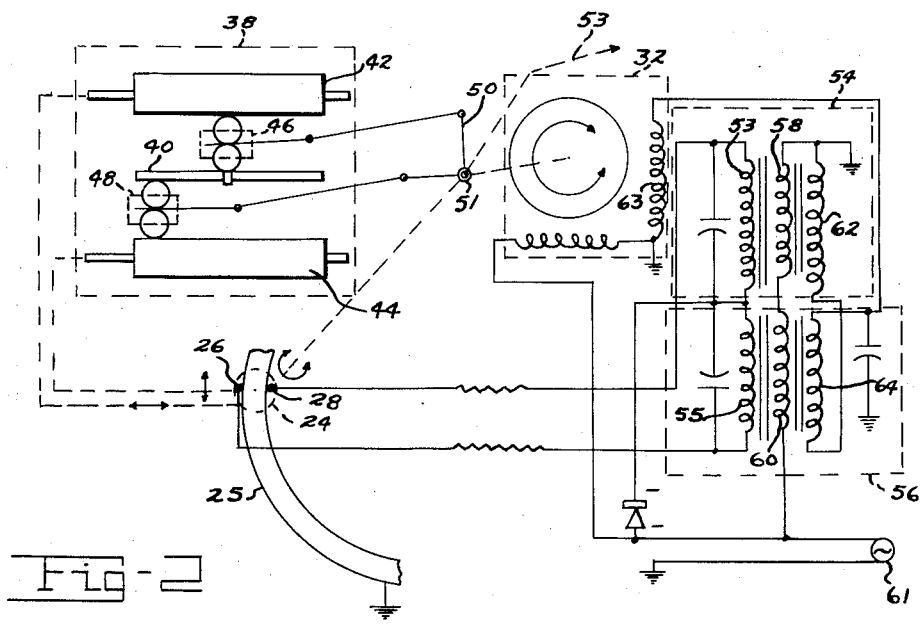
Fig. 2 is a schematic arrangement of the component parts of the invention and shows the circuit diagram of the stylus control mechanism.

A ball and disk type plotting board integrator 38 is connected to the *x* and *y* drive motors and actuates them so the stylus moves over the surface 30 of the plotting board 12 at a speed and direction proportional to the speed and heading of the aircraft. The operation of a typical integrator is as follows: Referring to Fig. 2, the aircraft or vehicle ground speed is fed into the Scotch yoke type integrator disk 40 so it rotates on its axis at a speed proportional to the speed of the aircraft. *x* and *y* drive rollers 42 and 44 are rotatably mounted above and below disk 40. Friction ball drivers 46 and 48 in engagement with the drive rollers 42 and 44 and disk 40 are positioned along the diameter of disk 40. The balls 46 and 48 are connected to a mechanical linkage 50. The linkage consists of arms rigidly secured to each other at right angles. The apex 51 of these arms is pivotally mounted on a support, not shown, and the opposite ends of the arms are connected to the friction balls. With this arrangement, when friction balls 46 are exactly over the center of disk 40, friction balls 48 will be at the end of the diameter. Since the disk 40 has no linear velocity at its center and a maximum linear velocity at its periphery, friction balls 46 will not rotate when disk 40 is rotating. Consequently, *x* drive roller 42 will not rotate. On the other hand, friction balls 48 will rotate at a speed equal to the peripheral velocity of disk 40 and consequently *y* drive rollers 44 will be driven proportionally fast. This corresponds to a situation where the aircraft if initially properly orientated is driven in the true north direction, for example. In this way, if changes in heading and ground speed are communicated to linkage 50 and disk 40, the friction balls will move in various positions along the diameter of disk 40 and the movement as indicated schematically by the dotted lines in Fig. 2 will be accurately reflected in the output of integrator 38 and in the movement of stylus 24 on the surface 30 of the plotting board.

In the standard plotting board, the stylus was originally a pencil which drew a line on a map reflecting the position of the aircraft. Here the objective is to cause the aircraft to follow a predetermined course on a map on a plotting board. To do this, the course 25 the aircraft is to follow is first drawn using electroconductive ink on the surface 30 of the plotting board, as shown in Fig. 2. The probes 26 and 28 of stylus 24 are positioned over the ink line 25 and contact it. These probes 26 and 28 are connected to the input coils 53 and 55 of a pair of saturable core transformers 54 and 56. The primary windings 58 and 60 of these transformers are connected to a 110 volt, 400 cycle source 61. The secondaries 62 and 64 of the transformers are connected to the motor coil windings 63 and provide a power source for the two phase motor 32. It is evident that as long as contacts 26 and 28 of stylus 24 engage the conducting line 25 current will flow through the input coils 53 and 55 saturating the cores of both transformers 54 and 56. This saturation has the effect of cutting off the voltage in the secondary coil and hence the power to the motor 32. When the one or the other of the contacts or probes 26 and 28 move off the conducting line, the current to input coil connected to the contact is cut off. This desaturates the core of the transformer and hence permits the primary coils to produce a voltage in one of the secondary coils which actuates the motor 32. The secondary coils are connected together in opposition and are designed to transmit oppositely directed voltages to the motor. Hence the sense of rotation of the two phase motor 32 will depend on which contact moves off the conducting line 25. When motor 32 is actuated, stylus 24 rotates until contacts 26 and 28 both engage the conducting line again. As shown by the schematic portion of Fig. 2, this rotation of the stylus 24 is connected to linkage 50 which in turn is connected to means 53 which controls the autopilot of the aircraft. Accordingly the rotation of the stylus causes both the direction of the aircraft to change and causes the integrator 38 to move the stylus in the direction of the inked line.

Figure 3:
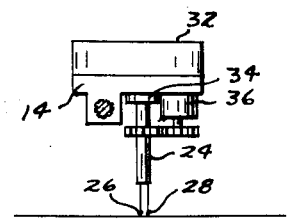
Fig. 3 is a functional block diagram of the automatic curve follower and plotting board.

In actual practice, synchros are used to accomplish the required connections. As disclosed in the functional block diagram in Fig. 3, the output of the integrator 38 is connected to synchrogenerators which are in turn electrically connected to the synchrocontrolled transformers that actuate servomechanisms driving $x$ and $y$ drive motors 16 and 20 and lead screws 18 and 22. This moves stylus 24 along the plotting board. Similarly, the synchrogenerator 36 mounted on carriage 14 and connected to stylus 24 so they rotate in a 1:1 relationship is connected to synchrocontrolled generators and servomechanisms which control the integrator 38 and the autopilot.

It is important to note that as long as contacts 26 and 28 of stylus 24 engage conducting line 25, the cores of transformers 54 and 56 will be saturated and there will be no output voltages in secondary coils 62 and 64. Hence, motor 32 and servogenerator 36 will not rotate and the autopilot will receive no signal to change course. Consequently, when the stylus moves over an intersection of conducting lines, the electrical control system will be unaffected and the plane will follow a steady course.

Various modifications may be made of this construction within the scope of this invention and the above disclosure is to be interpreted as setting forth the principles and preferred embodiment and not in a limiting sense.

We claim:

1. An apparatus for navigation of a mobile craft comprising a support, said support having a surface, one portion of said surface being electrically conductive, the other portion of said surface being electrically nonconductive, one of said portions representing the course the craft is to follow, a stylus movably mounted on said support, said stylus having spaced electrical contacts engaging the portion of the surface representing the course the craft is to follow, motive means connected to said stylus for driving it to any point on the surface of the support at a speed and direction proportional to the speed and direction of the craft, rotating means connected to said stylus, control means connected to said rotating means, said control means including said spaced electrical contacts and a portion of said surface, said rotating means being actuated by said control means when any of said spaced electrical contacts fails to engage the portion of the surface representing the course the craft is to follow, said stylus rotating until both of said electrical contacts are in engagement with the portion of said surface representing the course the craft is to follow, said rotating means connected to said motive means and to craft heading control means to cause said stylus to follow the portion of said surface representing the course the craft is to follow and to cause the craft to alter its direction in accordance with changes in direction of said stylus as it travels along the portion of the surface representing the course the craft is to follow.

2. The apparatus set forth in claim 1 wherein said support comprises an aircraft plotting board, and said motive means connected to said stylus for driving it to any point on the surface of the plotting board at a speed and direction proportional to the velocity of the craft includes a plotting board integrator.

3. The apparatus set forth in claim 1 wherein said control means comprises a pair of saturable core transformers, having primary windings excited by an input power source, and secondary windings connected together in opposition, core saturating means connected to each of said electrical contacts on said stylus connected to one of said core saturating means and actuating it so long as said electrical contacts engage a portion of said surface representing the course the craft is to follow, said rotating means comprising a two phase motor, each of said secondary windings of said transformers connected to the motor coil windings of said two phase motor and actuating said motor when one of the transformer cores is not saturated, the direction of rotation of the motor depending on the transformer whose core is unsaturated.

4. The apparatus set forth in claim 3 wherein said support comprises an aircraft plotting board and said motive means connected to said stylus for driving it to any point on the surface of the plotting board at a speed and direction proportional to the velocity of the craft includes a plotting board integrator.

References Cited in the file of this patent

UNITED STATES PATENTS

| | | |
|---|---|---|
| 2,381,478 | Zukor | Aug. 7, 1945 |
| 2,526,682 | Mulberger et al. | Oct. 24, 1950 |
| 2,582,588 | Fennessy et al. | Jan. 15, 1952 |
| 2,594,716 | Bailey | Apr. 29, 1952 |
| 2,598,937 | Parker | June 3, 1952 |